: US008434088B2

United States Patent
Banerjee et al.

(10) Patent No.: US 8,434,088 B2
(45) Date of Patent: Apr. 30, 2013

(54) OPTIMIZED CAPACITY PLANNING

(75) Inventors: Pradipta Kumar Banerjee, Bangalore (IN); Swarna Latha Mylavarapu, Bangalore (IN); Vijay K Sukthankar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 501 days.

(21) Appl. No.: 12/707,707

(22) Filed: Feb. 18, 2010

(65) Prior Publication Data

US 2011/0202925 A1 Aug. 18, 2011

(51) Int. Cl.
*G06F 9/46* (2006.01)
(52) U.S. Cl.
USPC ............ 718/104; 718/100; 718/102; 718/105
(58) Field of Classification Search .............. 718/1, 100, 718/102, 103, 104, 105
See application file for complete search history.

(56) References Cited

U.S. PATENT DOCUMENTS

| | | | |
|---|---|---|---|
| 6,597,907 B1 * | 7/2003 | Pruitt et al. | 455/423 |
| 7,356,602 B2 | 4/2008 | Goldszmidt et al. | |
| 2004/0005041 A1 * | 1/2004 | Zahir Azami | 379/112.06 |
| 2005/0097560 A1 | 5/2005 | Rolia et al. | |
| 2005/0165925 A1 | 7/2005 | Dan et al. | |
| 2008/0028409 A1 | 1/2008 | Cherkasova et al. | |
| 2008/0228459 A1 | 9/2008 | Jiang et al. | |
| 2009/0077398 A1 * | 3/2009 | Bland et al. | 713/320 |
| 2010/0325281 A1 * | 12/2010 | Li et al. | 709/226 |

OTHER PUBLICATIONS

Jin Heo et al "Memory Overbooking and Dynamic Control of Xen Virtual Machines in Consolidated Environments".

* cited by examiner

*Primary Examiner* — Emerson Puente
*Assistant Examiner* — Willy W Huaracha
(74) *Attorney, Agent, or Firm* — Yee & Associates, P.C.; David A. Mims, Jr.

(57) ABSTRACT

A computer implemented method, system and/or program product determine capacity planning of resources allocation for an application scheduled to execute on a virtual machine from a set of multiple applications by computing a mean associated with a pool of pre-defined resources utilization over a time interval; computing a variance associated with the pool of pre-defined resources utilization over the same time interval; identifying a set of resource to execute the scheduled application from the pool of pre-defined resources, wherein the pool of pre-defined resources is created from a pre-defined Service Level Agreement (SLA); and allocating a set of fixed resources from the pool of pre-defined resources to execute the application based on the mean resource utilization.

20 Claims, 3 Drawing Sheets

OPTIMIZED CAPACITY PLANNING

BACKGROUND

Embodiments of the invention relate to the field of computers, and specifically to optimize planning of computer resources, such as allocating computer resources.

Conventionally server consolidation using virtualization has been used to reduce the total number of physical servers by hosting multiple Operating System (OS) images on a single physical box using virtualization technologies. Proper capacity planning to determine the number of OS's that can run as Virtual Machines (VMs) on a single physical host and how many such physical hosts will be required and are key to a successful server consolidation. One of the challenges is of capacity planning for the target physical servers hosting multiple OS images as VMs. Analysis of historical utilization data helps in better decision making and removes the need for any guess work in planning the optimization solution. However given the variation in type and characteristics of workloads, even for an experts in this filed, capacity planning using the analysis information becomes more of an art than science, relying on subjectivity of the analysts. Capacity planning from server consolidation perspective is complex.

BRIEF SUMMARY

Embodiments of the invention disclose a method, system and/or program product determine capacity planning of resources for an application scheduled to execute on a virtual machine by computing a mean associated with the resource utilization over a time interval; and further computing a variance associated with the resource utilization over a time interval; subsequently identifying a set of resource to execute the application from a pool of resources, wherein the pool of resources is created against a pre-defined Service Level Agreement; and allocating a set of fixed resources to execute the application based on the mean resource utilization. Further identifying the set of resource to execute the application typically would make use of an artificial intelligence technique. The artificial intelligence technique includes at least one of genetic algorithm or fuzzy logic or Bayesian belief network. Further embodiments relate to reserving a pool of resources for executing a set of tasks associated with the application, wherein the size of the free pool of resource is determined by the pre-determined SLA and the variance of resource utilization, and the resource comprises at least one of a server or processor or memory or storage.

DETAILED DESCRIPTION

Figure 1:
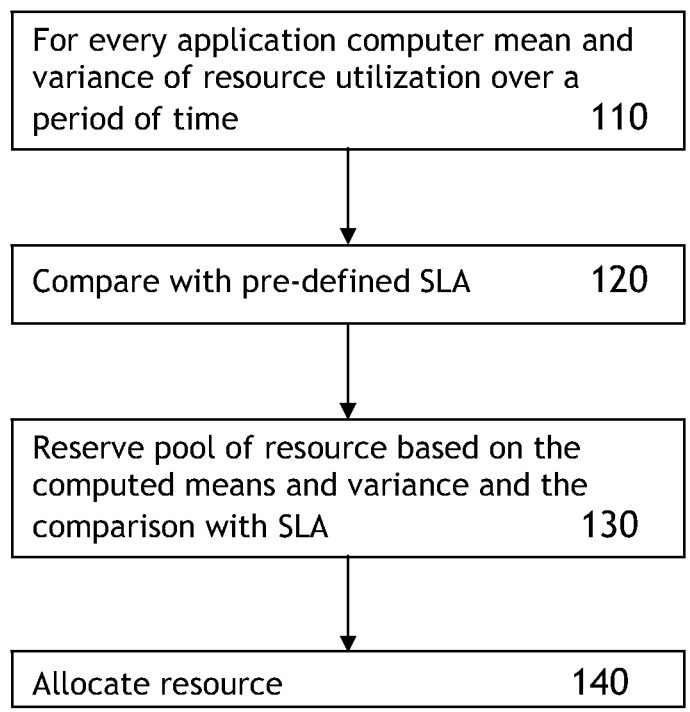
FIG. 1 depicts a high level flow chart of exemplary steps taken to optimize recourses in capacity planning.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Algorithms used herein in one embodiment of the invention are now presented and described. In the foregoing description "i" denoted a physical server and "j" denotes an application or a virtual machine. The inputs are classified as follows N=Number of physical servers, i=1 to N
K=Number of applications/VMs, j=1 to K
$P_i$=Processor Capacity of Server i
$M_i$=Memory Capacity of Server I
$P_j(\xi)$=Processor requirement (random) variations for application j where $p_j$, and $vp_j$ are average and standard deviations of processor usage by application j,
mj $(\xi)$=Memory requirement (random) variations for application j where $m_j$, and $vm_j$ are average and standard deviations of memory usage by application j
$SLj$=Service level target of application j
$\eta$=Confidence level desired by applications with respect to service level targets.

For the VM self management resource consumption, various advanced virtualization features monopolize the use of some amount of resources, and thus are not available for application usage.

$sp_{ij}$=Processors consumed by application j on server I
$sm_{ij}$=Memory consumed by application j on server i
Deterministic variables are used defined as $x_i$=Binary (0 or 1) variable representing the state of server i (0=server active 1=server shutdown)

$y_{ij}$=Binary (0 or 1) variable representing the state of partition j on server i (0=partition active 1=partition doesn't exist)

$fp_i$=Amount of processor capacity reserved in common pool of server $fm_i$=Amount of memory reserved in common pool of server i Random Variables are defined as $ep_i(\xi)$=Amount of excess quantity above processor capacity requested by applications deployed on server i $em_i(\xi)$=Amount of excess quantity above memory capacity requested by applications deployed on server i $up_i(\xi)$=Amount of unutilized processor capacity in server i $um_i(\xi)$=Amount of unutilized memory capacity in server i $sl_j(\xi)$=Service level of application j The objective function is to minimize the number of servers required to deploy all the application subject to the below constraints.

Given the above, the following constraints needs to be solved—Constraint (1): Processor capacity constraints of server i $$\sum_{j=1}^{K}(p_j(\xi)+sp_{ij})*y_{ij}+up_i(\xi)-ep_i(\xi)=P_i$$

Constraint (2): The amount of processor capacity on a server to be reserved in the common pool is at least a factor of standard deviation of the processor workloads of "all" the applications deployed on the server.

$$fp_i \geq k*vp_{ij}*y_{ij} \forall i, \forall j$$

This constraint will help in addressing the SLA during various application workloads on the server.

Constraint (3): Ensure that each deployed application onto a server gets a minimum amount of memory resources equal to the average memory consumption of the application.

$$\sum_{j=1}^{K}(p_j+sp_{ij})*y_{ij}+fp_i=P_i \forall i$$

Constraint (4): Memory capacity constraints of server i $$\sum_{j=1}^{K}(m_j(\xi)+sm_{ij})*y_{ij}+um_i(\xi)-em_i(\xi)=M_i \forall i$$

Constraint (5): The amount of memory capacity on a server to be reserved in the common pool is at least a factor of standard deviation of the memory workloads of all the applications deployed on the server.

$$fm_i \geq k*vm_{ij}*y_{ij} \forall i, \forall j$$

Constraint (6): Ensure that each deployed application on to a server gets a minimum amount of processor resources equal to the average processor requirement of the application.

$$\sum_{j=1}^{K}(m_j+sm_{ij})*y_{ij}+fm_i=M_i \forall i$$

Constraint (7): Application j of server i can be activated only if server i is running $$y_{ij}-x_i \leq 0 \forall i,j$$

Constraint (8): An application can be deployed on only one server $$\sum_{j=1}^{K} y_{ij}=1 \forall j$$

Constraint (9): Application service level constraints. Service level achieved by an application should be greater than the service level targets with desired confidence level.

$$Pr\{sl_j(\xi) \geq SL_j\} \geq \eta$$

and $\eta$ has been defined previously.

The solution in one embodiment is based on the use of genetic algorithm. By utilizing solutions for the constraints describe/defined above, a combined genetic algorithm and Monte Carlo Simulation solves the above complex stochastic optimization problem. It should be obvious to one skilled in the art that other techniques in the filed of artificial intelligence may also be used for example fuzzy logic, Bayesian networks etc.

Packing algorithm used in a genetic algorithm (GA)—The first step in the GA used is to generate a sequence of applications and assigning them to servers. Applications are packed/assigned onto the server using the sequence generated by the GA. To assign the applications to the servers, the resource requirement of the workload as considered random compared to prior art deterministic models that use peak workloads to calculate capacity. Since resource requirements of workload result in a random number, the probability that the "total" future resource requirement from each of the workload deployed on the server is satisfied by the approach of allocating resources described herein. For example, the probability/confidence level (X) that this deployment meets the required SLA is 0.90 for each of the applications A1, A5, A9). This application SLA requirement is used as an input to determine the size of a common resource pool which is a factor (k) of combined variability of each of the applications chosen to be deployed on the server.

Validation and scoring procedure used GA—In one embodiment, a Monte Carlo simulation (which relies on repeated random samplings to compute a result) is used to generate future resource requirements on each of the application. Hypothesis testing is used to test the solution by evaluating the fitness of the assignment (i.e., with what confidence level the deployment meets the application SLA requirements). Based on the generated future workloads on the applications, the sample's SLA statistics (mean, standard deviation) achieved by each of application on the server are calculated. Since the population standard deviation of the service levels of the application deployment may be unknown, the sample's standard deviation is used as an estimate of the population standard deviation of service level. In order to ensure that a deployment meets a population's mean service level of the deployment greater than or equal to the application's target SLA with a confidence level of X %, a one sided t-test is used to arrive at the lower bound for a sample's mean service level.

The population mean SLA is derived and checked to determine if it is equal to or greater than the minimum required SLA for the given confidence level. If the population means SLA satisfies this evaluation, the solution is deemed to be valid. Each valid solution is scored and either accepted or rejected before considering it for the next generation. The steps of the complete genetic algorithm are described below. For simplicity sake in the algorithm steps, application workloads on CPU and memory are just referenced as workloads. In one embodiment, the presently disclosed process arranges target servers in decreasing order of their capacities while deploying applications/VMs.

The above described algorithm is advantageously used to allocated resources and plan resource allocation. In FIG. 1, in step 110 for every application scheduled to executed on a virtual server, a mean associated with the resource utilization of the application and a variance associated with the utilization of the application is computed over a given or fixed time interval. Once the mean and variance are computed in step 120, a comparison is made with the pre-defined SLA to identify a set of resources to execute the application from a pool of resources. In step 130 these resources identified are reserved and in step 140 these resources are allocated at an appropriate instance of time, freed up and then again assigned to the pool of resources.

Figure 2:
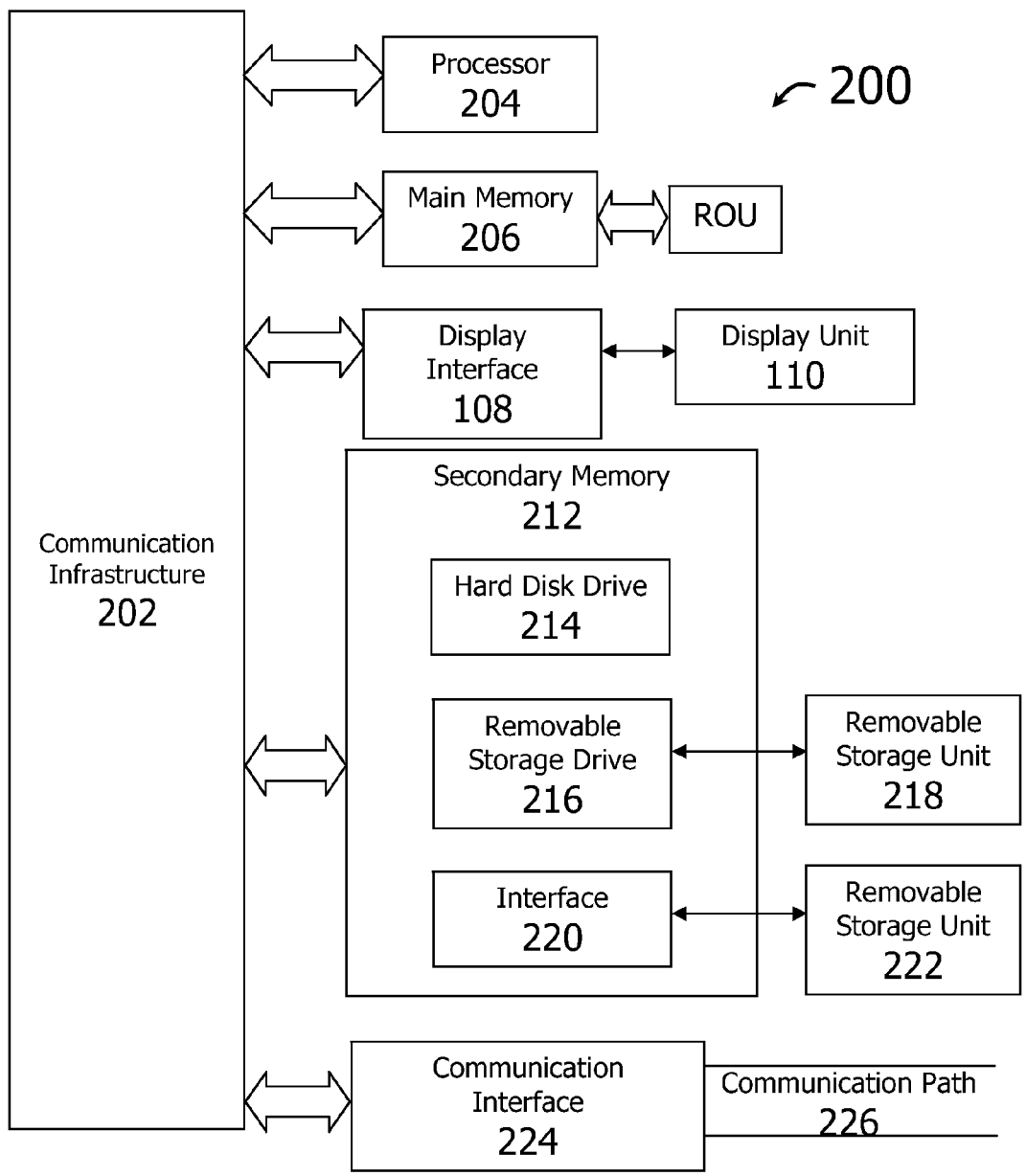
FIG. 2 illustrates an exemplary data processing system such as a computer in which the present disclosure may be implemented.

With reference now to the other figures, and in particular to FIG. 2, there is depicted a block diagram of an exemplary, data processing system 200, also referred to broadly as a computer 200, which may be utilized by embodiments of the invention. Note that some or all of the exemplary architecture, including both depicted hardware and software, shown for and within computer 200 may be utilized by software deploying server, as well as user computer 306, servers 308a-n and other computing resources depicted and described in FIG. 3.

FIG. 2 illustrates a block diagram of an exemplary data processing system 200, for example a computing system such as a desktop computer, laptop computer, PDA, mobile phone and the likes, that can be used for implementing exemplary embodiments of the present invention. Data processing system 200 includes one or more processors, for example processor 204 as illustrated in FIG. 2 which advantageously implements the method described hereinabove. Processor 204 is coupled to a communication infrastructure 202 (for example, a communications bus, cross-over bar, or network). Various software embodiments are described in terms of this exemplary data processing system. After reading this description, it will become apparent to a person of ordinary skill in the relevant art(s) how to implement the invention using other data processing systems and/or computer architectures.

Exemplary data processing system 200 can include display interface 208 that forwards graphics, text, and other data from the communication infrastructure 202 (or from a frame buffer not shown) for display on display unit 210. Data processing system 200 also includes main memory 206, which can be random access memory (RAM), and may also include secondary memory 212, and the main memory 206 can additionally be provided with a Resource Optimization Unit (ROU) (not shown in the figure), which can be advantageously used to execute the exemplary genetic algorithm described above. Secondary memory 212 may include, for example, hard disk drive 214 and/or removable storage drive 216, representing a floppy disk drive, a magnetic tape drive, an optical disk drive, etc. Removable storage drive 216 reads from and/or writes to removable storage unit 218 in a manner well known to those having ordinary skill in the art. Removable storage unit 218, represents, for example, a floppy disk, magnetic tape, optical disk, etc. which is read by and written to by removable storage drive 216. As will be appreciated, removable storage unit 218 includes a computer usable storage medium having stored therein computer software and/or data.

In exemplary embodiments, secondary memory 212 may include other similar means for allowing computer programs or other instructions to be loaded into the computer system. Such means may include, for example, removable storage unit 222 and interface 220. Examples of such may include a program cartridge and cartridge interface, such as that found in video game devices, a removable memory chip, such as an EPROM, or PROM and associated socket, and other removable storage units 222 and interfaces 220 which allow software and data to be transferred from removable storage unit 222 to data processing system 200.

Data processing system 200 may also include a communications interface 224. Communications interface 224 allows software and data to be transferred between the data processing system and any other external devices. Examples of communications interface 224 may include a modem, a network interface, such as an Ethernet card, a communications port, a PCMCIA slot and card, etc. Software and data transferred via communications interface 224 are typically in the form of signals which may be, for example, electronic, electromagnetic, optical, or other signals capable of being received by communications interface 224. These signals are provided to communications interface 224 via communications path (that is, channel) 226. Channel 226 carries signals and may be implemented using wire or cable, fiber optics, a phone line, a cellular phone link, an RF link, and/or other communications channels.

The terms "computer program medium," "computer usable medium," and "computer readable medium" are used to generally refer to media such as main memory 206 and secondary memory 212, removable storage drive 216, a hard disk installed in hard disk drive 214, and signals thereof. Computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface, including a wired network or a wireless network, which allows a computer to read such computer readable information.

Computer programs, also called computer control logic, are typically stored in main memory 206 and/or secondary memory 212. Computer programs may also be received via communications interface 224. Such computer programs, when executed, can enable the computer system to perform the features of exemplary embodiments of the invention as discussed herein. In particular, computer programs, when executed, enable processor 204 to perform the features of data processing system 200. Accordingly, such computer programs represent controllers of the data processing system.

Embodiments of the invention disclosed methods that may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

Figure 3:
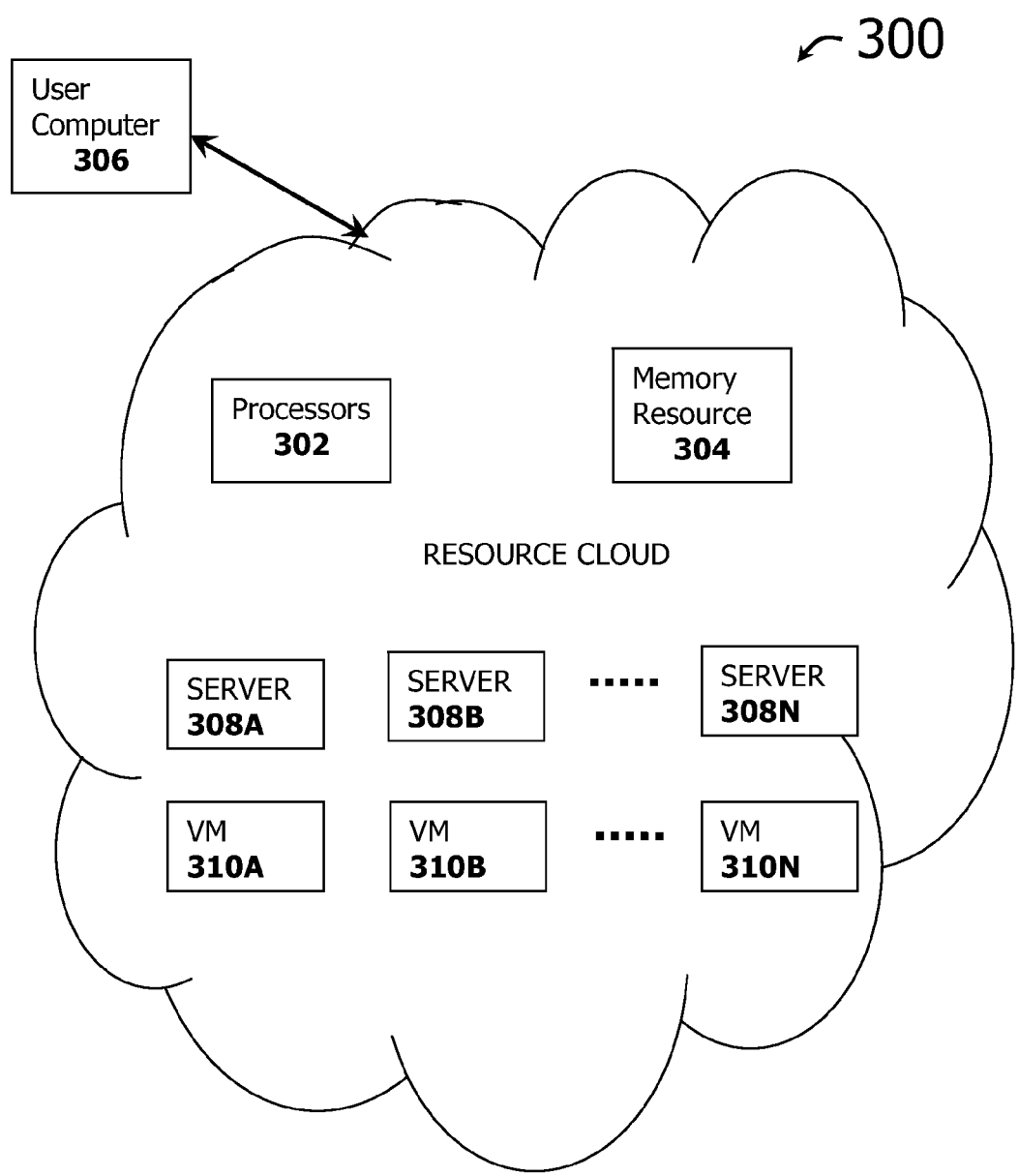
FIG. 3 is a resources cloud as used in one embodiment of the invention.

Capacity planning in a data center seeks server consolidation to minimize the number of physical servers required to run the applications/VMs with fluctuating workloads while ensuring SLA for the applications. In accordance with the present disclosure, shared resource pools are allocated in an optimized manner according to predicted future loads. As described herein, resources are allocated to an application and/or virtual machine (VM) based on past average workloads of the application. For example, as shown in FIG. 3, a resource cloud 300 comprises processors 302, memory resources 304 (comprising system memory and/or secondary mass storage memory), and other resources (e.g., operating systems, network connections, etc.), including a ROU that are available for use by a user computer 306 to execute applications, either directly on servers (which comprise the processors 302, memory resources 304, etc.) or through the use of VM (which utilizes the processors 302, memory resources 304, etc.). Viewed another way, resource cloud 300 may comprise multiple servers (308a-n, where "n" is an integer), and/or multiple VMs (310a-n, where "n" is an integer). Thus, embodiments of the invention may be utilized to 1) minimize the number of servers required to execute an application or a set of applications (chromosome);

2) minimize the number of VMs that are required to execute an application or chromosome; or 3) determine the number of servers are required to enable one or more VMs.

As described herein, while allocating the resources to applications/VMs on a server, steps are taken to ensure a fixed quantity of resources are allocated to the applications on the server, and that some amounts of resources are left as free resources on the server. The resource quantities to be left free on a server are algorithmically determined utilizing the methodology described below.

In one embodiment, the free resources on the server are used to address the variation in workload considering the application service level agreement (SLA). The application SLA is a level of ability/service that is contractually guaranteed by the provider of the application and/or its execution (i.e., the capacity of service-provided hardware on which the application is to run). Rather than consider just peak loads to provision the resources on servers, which results in over provisioning of resources, the present disclosure addresses the problem of resource allocation/reservation in a more realistic way (e.g., by utilizing the algorithms described below) to allocate certain a quantity of dedicated resources to applications, and to keep a predetermined quantity of free server resources for addressing workload fluctuations. The process described herein results in higher resource utilization and better packing of applications/VMs on servers while addressing the fluctuation of application resource requirements.

In an exemplary embodiment, particularly using the GA described above, some or all of which may be executed on a processor, for allocating resources in servers and/or VMs for workloads is presented. The mean and variance of workloads for each of multiple applications is computed. Using application workload statistics (e.g., CPU and memory usage) that have been captured for specifically identified applications over a period of time, the mean and variance of workloads for each application is computed. A probability distribution is fit for each of the application workloads. In one embodiment, based on the probability distribution observed from the captured data, the application workloads can be considered to be normally distributed.

Multiple applications, which have had their mean and variance of workload computed, are randomly sequenced and encoded as a single chromosome. A chromosome is defined as and represents the random sequence of applications. The length of the chromosome is equal to the number of applications. Each gene in the chromosome represents a unique application, and is identified by that unique application's identifier (ID). Thus, each chromosome contains a list of all applications that have been encoded onto that chromosome, which is repeatedly executed to generate a set of chromosomes. This set of chromosomes creates an initial population of chromosomes.

An initial application from a selected chromosome is assigned to a set of resources on a server/VM for execution. Each application in the chromosome is selected in the same sequence that it appears in the chromosome. Utilizing using constraints (7) and (8) described above, application work load statistics from the captured utilization data and the following criteria, a server onto which the picked application can be deployed is located.

A server is selected from a used servers list. Initially, this used servers list is empty, and an unused servers list contains all available servers. A check is made to determine if resources on the server can be reserved, based on the average workload of the application and the free pool capacity on the server being greater than k (a constant) times the combined variance of deployed applications and the picked application. This determination is made by using the packing algorithm described above, which is formulated into constraints (1), (2), (3), (4), (5) and (6) listed above.

If the service level agreement (SLA) for that particular application is satisfied, then the selected server is a potential server for deploying that application. A check is them made to ascertain whether the SLAs are achieved by this new deployment. Thus, using simulation of workloads (for already deployed applications on the server and the new application under consideration), and hypothesis testing a determination is made as to whether SLAs of applications are within the required SLA limits at a certain confidence level, as described in constraint (9) above, which is used in the said determination.

Exemplary calculations of the application SLA are performed in the following manner. If a sum of above average work loads of all deployed applications on the server and the new application is less than the server's common pool, then the service level is considered as 100%. If a sum of above average work loads of all deployed applications and the new application is greater than the server's common pool, then an assumption is made that the share of common pool resources used for the application during this workload is proportional to the common pool capacity of the server. The service level is then deemed to be the ratio of (reserved resources for the application and a proportion of common pool resource given to the application)/the workload of the application. From these steps, the average service level of the application is computed based on "all" (of the examined) simulated workloads of the application. Thus, if the SLA for the application is met while running on the resources selected, then a notation is made that the application can be deployed in the future on the server to which those resources are associated.

It should be noted that if the selected resources do not meet the criteria established above for executing the application, then there is no deployment of that application to that server.

In that case, then another server from the used server list is examined utilizing the SLA process just described. If there are no servers in the used server list to deploy the application, then a next server from the unused servers list is selected, and the process of examining SLA performance continues as described. The process of scoring the SLA performance for each application in a chromosome continues in a reiterative manner until there are no more applications in the chromosome to be evaluated, wherein at that point, the chromosome is validated and scored. The number of servers in the used server list is the score of the chromosome. A lower score is better than a higher score. For example, if the chromosome must use five servers/VMs to meet its SLA, five is deemed a better score than seven (in which another chromosome used seven servers/VMs to meet its SLA).

A next generation chromosome is then generated from the initial chromosome that has just been evaluated. From the population of chromosomes in the current generation, two chromosomes are randomly picked (without chromosomes' replacement) for crossover and mutation operations. Crossover occurs when two chromosomes exchange one or more applications; mutation occurs when a single chromosome switches the positioning of two or more applications within that same single chromosome. Each of the new chromosomes (two from crossover and two from mutation) are scored, and the best two chromosomes (from all six) are selected and put in the next generation chromosomes list. This step continues until there are no unchanged chromosomes in the list.

The process continues in a reiterative manner using next generation chromosomes until a certain user defined number of generations are reached. In the final generation, the chromosomes (i.e., all next generation chromosomes) are rank ordered based on the chromosomes' score, and a solution that has the best score is selected. The genetic algorithm solution presents the number of target servers and the mapping of applications/VMs to each of those target servers. Subsequently, the chromosome (from the first and next generation chromosomes) that has the best score (utilizes the fewest resources, such as servers, VMs, processors, memory, etc.) is then deployed and the process is completed.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the disclosure of the present application in detail and by reference to illustrative embodiments thereof, it will be apparent that modifications and variations are possible without departing from the scope of the disclosure defined in the appended claims.

What is claimed is:

1. A method for planning resource allocation, the method comprising:
computing a mean and a variance of a workload for each application in a set of applications using application workload statistics captured for specifically identified applications over a period of time;
randomly sequencing and encoding the set of applications as a single chromosome wherein the single chromosome represents a random sequence of the applications in the set of applications;
evaluating each application in the single chromosome to form a scored chromosome, wherein the evaluating comprises:
deploying one application selected in sequential order from the chromosome onto a server wherein the server is selected from a used servers list, wherein the selected server must be running and the application can only be deployed on one server;
determining whether resources on the server can be reserved, using an average workload of the application and a free pool capacity on a server being greater than k, a constant representing applications per virtual machine, times a combined variance of deployed applications and a variance of the selected application using a predetermined packing method formulated into a set of predetermined constraints;
determining whether a service level agreement (SLA) for the selected application is within required SLA limits at a predetermined confidence level, using simulation of workloads for already deployed applications on the server and the application under consideration, and hypothesis testing;

responsive to a determination that the service level agreement (SLA) for the selected application is satisfied, identifying the selected server as a potential server for deploying the selected application;

determining whether there are no more applications in the chromosome to be evaluated;

responsive to a determination that there are no more applications in the chromosome to be evaluated, validating and scoring the chromosome, wherein a number of servers in the used servers list, as a sum of servers used by the chromosome, is a score of the chromosome, and wherein a lower score is deemed better than a higher score;

generating a next generation chromosome, from a current generation of the single chromosome previously evaluated, by randomly selecting two chromosomes in the current generation, without chromosome replacement, for a crossover operation in which two chromosomes exchange one or more applications and a mutation operation in which a single chromosome switches positioning of two or more applications within a respective single chromosome to form new chromosomes comprising two chromosomes from crossover and two chromosomes from mutation to form a set of six chromosomes;

scoring each of the new chromosomes;

placing two chromosomes from the set of six chromosomes having a lowest score in a next generation chromosomes list;

repeating generating the next generation until one of there are no unchanged chromosomes in a next generation chromosomes list and a user defined number of generations is reached;

ranking each chromosome according to score;

selecting a solution comprising the chromosome having a lowest score, wherein the solution comprises a number of target servers and a mapping of applications/VMs to each of the target servers; and deploying the solution.

2. The method as claimed in claim 1, wherein determining whether the service level agreement (SLA) for the selected application is within required SLA limits at the predetermined confidence level further comprises:

determining whether a sum of above average work loads of all deployed applications on the server and the new application is less than a common pool of the server;

responsive to a determination that the sum of above average work loads of all deployed applications on the server and the new application is less than the common pool of the server, considering the service level as 100%;

responsive to a determination that the sum of above average work loads of all deployed applications and the new application is greater than the common pool of the server, assuming a share of common pool resources used for the application during the workload is proportional to the common pool capacity of the server and the service level is deemed to be a ratio of reserved resources for the application and a proportion of the common pool resource given to the application/the workload of the application; and computing an average service level of the application using all examined simulated workloads of the application.

3. The method as claimed in claim 1, wherein a length of the chromosome is equal to a number of applications in a list of all applications that have been encoded onto a respective chromosome, and each gene in the chromosome represents a unique application identified by a unique application identifier (ID).

4. The method as claimed in claim 1, wherein the set of predetermined constraints further comprises constraints including a processor capacity constraint of the server wherein an amount of processor capacity on the server to be reserved in the common pool is at least a factor of standard deviation of the processor workloads of "all" the applications deployed on the server; each deployed application onto the server receives a minimum amount of memory resources equal to an average memory consumption of the application; a memory capacity constraint of the server wherein the amount of memory capacity on the server to be reserved in the common pool is at least a factor of standard deviation of the memory workloads of all of the applications deployed on the server; each deployed application on to the server receives a minimum amount of processor resources equal to and average processor requirement of the application.

5. The method as claimed in claim 1, further comprises reserving a pool of resources for executing a set of tasks associated with the application wherein shared resource pools are allocated in an optimized manner according to predicted future loads and resources are allocated to the application and/or virtual machine (VM) using past average workloads of the application.

6. The method as claimed in claim 1, further comprises dynamically identifying a free pool of resources, wherein the free pool of resource is determined using the application SLA and a workload fluctuation calculated using a variance of the selected application using a predetermined packing method formulated into a set of predetermined constraints.

7. The method as claimed in claim 1, wherein the resource comprises at least one of a server or processor or memory or a storage or a resource optimization unit.

8. A computing system for planning resource allocation comprising:

at least a central processing unit; and a computer readable memory including a resource optimization unit (ROU), wherein the computer readable memory including the ROU containing computer executable instructions therein is coupled to the central processing unit, wherein the computer executable instructions in the computer readable memory including the ROU are executed by the central processing unit to:

compute a mean and a variance of a workload for each application in a set of applications using application workload statistics captured for specifically identified applications over a period of time;

randomly sequence and encoding the set of applications as a single chromosome wherein the single chromosome represents a random sequence of the applications in the set of applications;

evaluate each application in the single chromosome to form a scored chromosome, wherein the evaluating comprises:

deploy one application selected in sequential order from the chromosome onto a server wherein the server is selected from a used servers list, wherein the selected server must be running and the application can only be deployed on one server;

determine whether resources on the server can be reserved, using an average workload of the application and a free pool capacity on a server being greater than k (a constant representing applications per virtual machine) times a combined variance of deployed applications and a variance of the selected application using a predetermined packing method formulated into a set of predetermined constraints;

determine whether a service level agreement (SLA) for the selected application is within required SLA limits at a predetermined confidence level, using simulation of workloads for already deployed applications on the server and the application under consideration, and hypothesis testing;

responsive to a determination that the service level agreement (SLA) for the selected application is satisfied, identify the selected server as a potential server for deploying the selected application;

determine whether there are no more applications in the chromosome to be evaluated;

responsive to a determination that there are no more applications in the chromosome to be evaluated, validate and score the chromosome, wherein a number of servers in the used servers list, as a sum of servers used by the chromosome, is a score of the chromosome, and wherein a lower score is deemed better than a higher score;

generate a next generation chromosome, from a current generation of the single chromosome previously evaluated, by randomly selecting two chromosomes in the current generation, without chromosome replacement, for a crossover operation in which two chromosomes exchange one or more applications and a mutation operation in which a single chromosome switches positioning of two or more applications within a respective single chromosome to form new chromosomes comprising two chromosomes from crossover and two chromosomes from mutation to form a set of six chromosomes;

score each of the new chromosomes;

place two chromosomes from the set of six chromosomes having a lowest score in a next generation chromosomes list;

repeat generating the next generation until one of there are no unchanged chromosomes in a next generation chromosomes list and a user defined number of generations is reached;

rank each chromosome according to score;

select a solution comprising the chromosome having a lowest score, wherein the solution comprises a number of target servers and a mapping of applications/VMs to each of the target servers; and deploy the solution.

9. The computing system as claimed in claim 8, wherein the computer executable instructions in the computer readable memory including the ROU are executed by the central processing unit to:

determine whether the service level agreement (SLA) for the selected application is within required SLA limits at the predetermined confidence level further comprises:

determine whether a sum of above average work loads of all deployed applications on the server and the new application is less than a common pool of the server;

responsive to a determination that the sum of above average work loads of all deployed applications on the server and the new application is less than the common pool of the server, consider the service level as 100%;

responsive to a determination that the sum of above average work loads of all deployed applications and the new application is greater than the common pool of the server, assume a share of common pool resources used for the application during the workload is proportional to the common pool capacity of the server and the service level is deemed to be a ratio of reserved resources for the application and a proportion of the common pool resource given to the application/the workload of the application; and compute an average service level of the application using all examined simulated workloads of the application.

10. The computing system as claimed in claim 8, wherein a length of the chromosome is equal to a number of applications in a list of all applications that have been encoded onto a respective chromosome, and each gene in the chromosome represents a unique application identified by a unique application identifier (ID).

11. The computing system as claimed in claim 8, wherein the set of predetermined constraints further comprises constraints including a processor capacity constraint of the server wherein an amount of processor capacity on the server to be reserved in the common pool is at least a factor of standard deviation of the processor workloads of "all" the applications deployed on the server; each deployed application onto the server receives a minimum amount of memory resources equal to an average memory consumption of the application; a memory capacity constraint of the server wherein the amount of memory capacity on the server to be reserved in the common pool is at least a factor of standard deviation of the memory workloads of all of the applications deployed on the server; each deployed application on to the server receives a minimum amount of processor resources equal to and average processor requirement of the application.

12. The computing system as claimed in claim 8, wherein the computer executable instructions in the computer readable memory including the ROU are executed by the central processing unit to:

reserve a pool of resources for executing a set of tasks associated with the application wherein shared resource pools are allocated in an optimized manner according to predicted future loads and resources are allocated to the application and/or virtual machine (VM) using past average workloads of the application.

13. The computing system as claimed in claim 8, wherein the computer executable instructions in the computer readable memory including the ROU are executed by the central processing unit to:

dynamically identify a free pool of resources, wherein the free pool of resource is determined using the application SLA and a workload fluctuation calculated using a variance of the selected application using a predetermined packing method formulated into a set of predetermined constraints.

14. The computing system as claimed in claim 8, wherein the resource comprises at least one of a server or processor or memory or a storage or a resource optimization unit.

15. A computer program product for planning resource allocation comprising:

a non-transitory computer readable storage medium having computer executable instructions stored thereon, the computer executable instructions comprising:

computer executable instructions for computing a mean and a variance of a workload for each application in a set of applications using application workload statistics captured for specifically identified applications over a period of time;

computer executable instructions for randomly sequencing and encoding the set of applications as a single chromosome wherein the single chromosome represents a random sequence of the applications in the set of applications;

computer executable instructions for evaluating each application in the single chromosome to form a scored chromosome, wherein the computer executable instructions for evaluating comprises:
   computer executable instructions for deploying one application selected in sequential order from the chromosome onto a server wherein the server is selected from a used servers list, wherein the selected server must be running and the application can only be deployed on one server;
   computer executable instructions for determining whether resources on the server can be reserved, using an average workload of the application and a free pool capacity on a server being greater than k, a constant representing applications per virtual machine, times a combined variance of deployed applications and a variance of the selected application using a predetermined packing method formulated into a set of predetermined constraints;
   computer executable instructions for determining whether a service level agreement (SLA) for the selected application is within required SLA limits at a predetermined confidence level, using simulation of workloads for already deployed applications on the server and the application under consideration, and hypothesis testing;
   computer executable instructions responsive to a determination that the service level agreement (SLA) for the selected application is satisfied, for identifying the selected server as a potential server for deploying the selected application;
   computer executable instructions for determining whether there are no more applications in the chromosome to be evaluated;
   computer executable instructions for responsive to a determination that there are no more applications in the chromosome to be evaluated, for validating and scoring the chromosome, wherein a number of servers in the used servers list, as a sum of servers used by the chromosome, is a score of the chromosome, and wherein a lower score is deemed better than a higher score;
computer executable instructions for generating a next generation chromosome, from a current generation of the single chromosome previously evaluated, by randomly selecting two chromosomes in the current generation, without chromosome replacement, for a crossover operation in which two chromosomes exchange one or more applications and a mutation operation in which a single chromosome switches positioning of two or more applications within a respective single chromosome to form new chromosomes comprising two chromosomes from crossover and two chromosomes from mutation to form a set of six chromosomes;
computer executable instructions for scoring each of the new chromosomes;
computer executable instructions for placing two chromosomes from the set of six chromosomes having a lowest score in a next generation chromosomes list;
computer executable instructions for repeating generating the next generation until one of there are no unchanged chromosomes in a next generation chromosomes list and a user defined number of generations is reached;
computer executable instructions for ranking each chromosome according to score;
computer executable instructions for selecting a solution comprising the chromosome having a lowest score, wherein the solution comprises a number of target servers and a mapping of applications/VMs to each of the target servers; and
computer executable instructions for deploying the solution.

16. The computer program product as claimed in claim 15, wherein computer executable instructions for determining whether the service level agreement (SLA) for the selected application is within required SLA limits at the predetermined confidence level further comprises:
   computer executable instructions for determining whether a sum of above average work loads of all deployed applications on the server and the new application is less than a common pool of the server;
   computer executable instructions responsive to a determination that the sum of above average work loads of all deployed applications on the server and the new application is less than the common pool of the server, for considering the service level as 100%;
   computer executable instructions for responsive to a determination that the sum of above average work loads of all deployed applications and the new application is greater than the common pool of the server, for assuming a share of common pool resources used for the application during the workload is proportional to the common pool capacity of the server and the service level is deemed to be a ratio of reserved resources for the application and a proportion of the common pool resource given to the application/the workload of the application; and
   computer executable instructions for computing an average service level of the application using all examined simulated workloads of the application.

17. The computer program product as claimed in claim 15, wherein a length of the chromosome is equal to a number of applications in a list of all applications that have been encoded onto a respective chromosome, and each gene in the chromosome represents a unique application identified by a unique application identifier (ID).

18. The computer program product as claimed in claim 15, wherein the set of predetermined constraints further comprises constraints including a processor capacity constraint of the server wherein an amount of processor capacity on the server to be reserved in the common pool is at least a factor of standard deviation of the processor workloads of "all" the applications deployed on the server; each deployed application onto the server receives a minimum amount of memory resources equal to an average memory consumption of the application; a memory capacity constraint of the server wherein the amount of memory capacity on the server to be reserved in the common pool is at least a factor of standard deviation of the memory workloads of all of the applications deployed on the server; each deployed application on to the server receives a minimum amount of processor resources equal to and average processor requirement of the application.

19. The computer program product as claimed in claim 15, further comprises dynamically identifying a free pool of resources, wherein the free pool of resource is determined using the application SLA and a workload fluctuation calculated using a variance of the selected application using a predetermined packing method formulated into a set of predetermined constraints.

20. The computer program product as claimed in claim 15, wherein the resource comprises at least one of a server or processor or memory or a storage or a resource optimization unit.

* * * * *